(No Model.)

W. E. KARNS.
PACKING FOR OIL WELL PUMPS.

No. 568,069. Patented Sept. 22, 1896.

Witnesses

By his Attorneys,

Inventor
William E Karns.

UNITED STATES PATENT OFFICE.

WILLIAM E. KARNS, OF PARKER'S LANDING, PENNSYLVANIA.

PACKING FOR OIL-WELL PUMPS.

SPECIFICATION forming part of Letters Patent No. 568,069, dated September 22, 1896.

Application filed May 20, 1896. Serial No. 592,340. (No model.)

*To all whom it may concern:*

Be it known that I, WILLIAM E. KARNS, a citizen of the United States, residing at Parker's Landing, in the county of Armstrong and State of Pennsylvania, have invented a new and useful Packing for Oil-Well Pumps, of which the following is a specification.

My invention relates to packing for the working valves of oil-well pumps; and the object in view is to provide a simple and inexpensive packing adapted to resist the action of oil and the impurities carried thereby, and also adapted to resist the action of heat incident to steaming, particularly when the passage for the steam is formed by means of a tubular pump-rod passing axially through the valve, as in the pump shown and described in my application, Serial No. 591,689, filed May 15, 1896.

A further object of my invention is to provide a packing of single-piece construction, whereby it may be applied and removed with greater facility than independent alternately-disposed packing and spacing rings, as in the present practice.

A further object of my invention is to provide a simple method of constructing a single-piece valve-packing to form expanding-cavities.

Further objects and advantages of this invention will appear in the following description, and the novel features thereof will be particularly pointed out in the appended claims.

Figure 1:
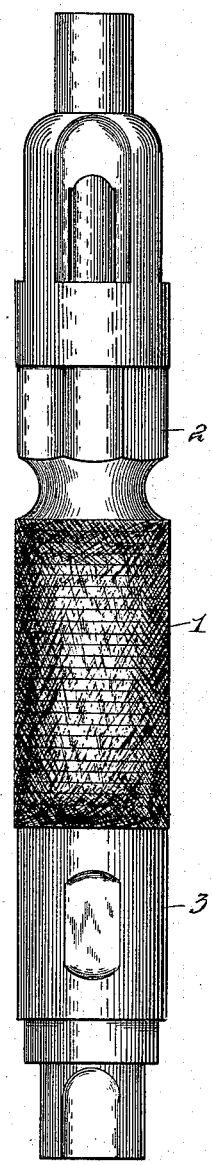
Figure 2:
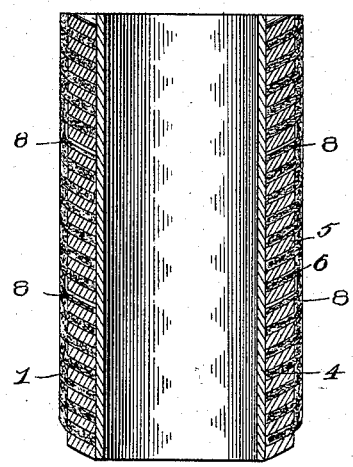
Figure 3:
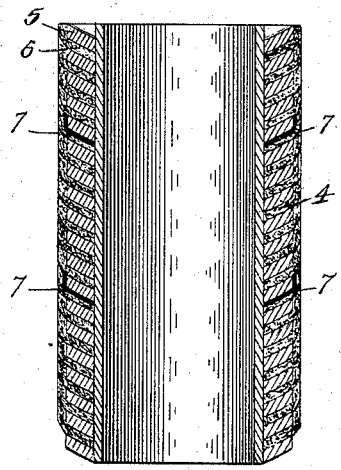

In the drawings, Figure 1 is a view of an oil-pump working valve fitted with packing constructed in accordance with my invention. Fig. 2 is a central vertical section of the packing detached. Fig. 3 is a similar view showing the spacing layers or rings of tin-foil or equivalent material in place.

Similar numerals of reference indicate corresponding parts in all the figures of the drawings.

The packing 1 embodying my invention is of cylindrical form, and is adapted to be fitted upon the usual cylindrical seat 2, provided in working valves for its reception, said packing being held in place by means of a removable collar 3, threaded upon the lower end of the seat. The packing consists of a cylindrical sleeve or core 4 of metal tubing, around which are arranged alternate layers 5 and 6 of dental rubber and webbing, which are subjected to heavy hydraulic pressure and vulcanized to form a compact mass which adheres firmly to the sleeve or core and fastens the webbing thereto. The result is a single-piece packing having an inner sleeve or core of metal and alternate layers of webbing and vulcanized rubber which are firmly united with each other and with the sleeve.

In order to prevent the adherence of the outer portions of a few of the layers of webbing to the exterior surfaces of the rubber layers, and thus form at intervals expansion-cavities into which fluid may be forced to expand said loose portions of the webbing to fit the pump or working barrel, I employ annular layers 7 of non-adhering material, such as tin-foil. The rubber, even after vulcanization, will not adhere to the surface of the tin-foil, and hence after the completion of the vulcanizing step of the process the tin-foil may be withdrawn to leave the exposed edges of the webbing free for expansion by means of liquid entering between said edges and the surfaces of the rubber layers. These layers of non-adhering material may also, if preferred, be extended inwardly approximately or quite to the sleeve or core, as shown in Fig. 3, to form cavities 8, as shown in Fig. 2, which receive fluid, said cavities also serving to lighten the article without detracting from the strength or efficiency thereof.

The packing, constructed as described, remains unaffected by the products of a well and the heat incident to steaming or other equivalent process.

Various changes in the form, proportion, and the minor details of construction may be resorted to without departing from the spirit or sacrificing any of the advantages of this invention.

Having described my invention, what I claim is—

1. A single-piece packing-cylinder having an inner metallic sleeve or core, and alternate layers of rubber and webbing united with the sleeve or core by vulcanization, substantially as specified.

2. A single-piece packing-cylinder having a sleeve or core surrounded by alternate united layers of rubber and webbing adhering inseparably to the sleeve or core, the peripheral edges of the layers of webbing extending beyond the outer surfaces of the layers of rubber to provide for expansion, substantially as specified.

3. The herein-described method of constructing a packing-cylinder consisting of applying alternate layers of rubber and webbing to a metallic sleeve or core, interposing layers of non-adhering material, as tin-foil, at intervals between the projecting outer edges of layers of webbing and the contiguous surfaces of the rubber, vulcanizing the same under pressure, and finally removing the non-adhering material to leave the outer edges of certain layers of the webbing free for expansion, substantially as specified.

4. A single-piece packing-cylinder for the working valve of oil-well pumps, the same comprising an inner metallic sleeve or core surrounded by alternate annular layers of vulcanized rubber and webbing, the outer edges of the latter projecting beyond those of the former, and also provided with spaced circumferential cavities between certain layers, whereby the contiguous free edges of the layers of webbing are exposed to outward pressure, substantially as specified.

In testimony that I claim the foregoing as my own I have hereto affixed my signature in the presence of two witnesses.

W. E. KARNS.

Witnesses:
JOHN H. SIGGERS,
HAROLD H. SIMMS.